(12) United States Patent
Goebel

(10) Patent No.: US 11,135,963 B1
(45) Date of Patent: Oct. 5, 2021

(54) TIE DOWN ANCHOR FOR PICKUP TRUCK

(71) Applicant: Bestop BullRing, LLC, Temecula, CA (US)

(72) Inventor: Steve Goebel, Boerne, TX (US)

(73) Assignee: Bestop BullRing, LLC, Temecula, CA (US)

( * ) Notice: Subject to any disclaimer, the term of this patent is extended or adjusted under 35 U.S.C. 154(b) by 0 days.

(21) Appl. No.: 16/921,902

(22) Filed: Jul. 6, 2020

(51) Int. Cl.
*B60P 7/08* (2006.01)

(52) U.S. Cl.
CPC .................. *B60P 7/0807* (2013.01)

(58) Field of Classification Search
CPC ......... B60P 7/0807; B60P 7/08; B60P 7/0815; B60P 7/0823; B60P 7/0876; B60P 7/10
USPC ........ 410/106, 107, 111, 116, 102, 112, 101, 410/97, 105, 108, 109
See application file for complete search history.

(56) References Cited

U.S. PATENT DOCUMENTS

| | | | |
|---|---|---|---|
| 2,609,761 A * | 9/1952 | Clark | B60P 7/0815 410/101 |
| 2,729,418 A * | 1/1956 | Maynard | B64C 1/20 410/102 |
| 3,102,708 A | 9/1963 | Crain | |
| 3,259,353 A | 7/1966 | Webb | |
| 3,298,652 A | 1/1967 | Burdick | |
| 3,351,356 A | 11/1967 | Clark et al. | |
| 3,421,726 A | 1/1969 | Getter | |
| 3,595,125 A | 7/1971 | Jacobs | |
| 3,623,690 A | 11/1971 | Bargman, Jr. | |
| 3,779,502 A | 12/1973 | Marberg | |
| 3,841,660 A | 10/1974 | Clark | |
| 3,950,010 A | 4/1976 | Robertson | |
| 4,072,113 A | 2/1978 | Thurston | |
| 4,191,108 A | 3/1980 | Jones | |
| 4,607,991 A | 8/1986 | Porter | |
| 4,630,982 A | 12/1986 | Fenner | |
| 4,699,410 A | 10/1987 | Seidel | |
| 4,948,311 A | 8/1990 | St. Pierre et al. | |
| 4,991,271 A | 2/1991 | Bauer et al. | |
| 5,141,277 A | 8/1992 | Alexander | |
| 5,273,382 A | 12/1993 | Yearick | |
| D349,036 S | 7/1994 | Egigian | |
| 5,326,203 A | 7/1994 | Cockrell | |
| 5,444,897 A | 8/1995 | Gross | |
| 5,456,443 A | 10/1995 | Taaffe | |
| 5,676,508 A | 10/1997 | Weicht | |
| D408,267 S | 4/1999 | Egigian et al. | |
| 5,971,684 A | 10/1999 | Wang | |
| 6,113,328 A | 9/2000 | Claucherty | |

(Continued)

*Primary Examiner* — D Glenn Dayoan
*Assistant Examiner* — Sunsurraye Westbrook
(74) *Attorney, Agent, or Firm* — Lowe Graham Jones PLLC

(57) ABSTRACT

A tie down anchor includes an anchor bar providing a point of attachment, an anchor plate having the anchor bar secured thereto, and left and right side plates secured to the anchor plate. A pin is secured to the left side plate and extends outwardly. An opening is defined on the right side plate and offset vertically form the pin. A fastener passing through the opening is engaged with the left side plate, urging the pin into an inner opening defined in a stake pocket defined by the wall of a pickup truck bed. The anchor bar may be retractable and retainers in a base plate secured below the anchor plate may releasably secure the anchor bar in an extended position.

20 Claims, 11 Drawing Sheets

(56) References Cited

U.S. PATENT DOCUMENTS

| | | | |
|---|---|---|---|
| 6,464,437 B1 | 10/2002 | Elwell | |
| 6,533,512 B2 | 3/2003 | Lin | |
| 6,604,898 B2 | 8/2003 | Price | |
| 6,764,259 B1 | 7/2004 | Preta | |
| 6,918,721 B2 * | 7/2005 | Venton-Walters | B60P 7/0807 |
| | | | 410/102 |
| 6,969,219 B2 | 11/2005 | Speece et al. | |
| 7,086,815 B2 * | 8/2006 | Bruns | B64D 9/003 |
| | | | 410/107 |
| 7,131,387 B1 * | 11/2006 | Czipri | B63B 21/045 |
| | | | 114/218 |
| 7,134,819 B2 | 11/2006 | Bullock et al. | |
| 7,481,610 B1 | 1/2009 | Egigian | |
| 8,079,793 B2 | 12/2011 | Thoma et al. | |
| 8,388,286 B2 | 3/2013 | Niklas et al. | |
| 8,613,578 B2 | 12/2013 | Hutchinson | |
| 9,193,294 B1 | 11/2015 | Egigian | |
| 9,511,705 B1 | 12/2016 | Egigian | |
| 2001/0031187 A1 | 10/2001 | Goham et al. | |
| 2008/0260487 A1 | 10/2008 | Grasso | |
| 2012/0181816 A1 | 7/2012 | Jutila et al. | |

* cited by examiner

TIE DOWN ANCHOR FOR PICKUP TRUCK

FIELD OF THE INVENTION

This application relates to implementing integrated cargo attachment points and tie downs for pickup trucks.

BACKGROUND OF THE INVENTION

Many pickup trucks from most manufacturers provide stake pockets on the walls of the truck bed. Tie downs may be mounted within these stake pockets in order to provide a point of attachment for ropes and straps. Recent changes in the shape and dimensions of stake pockets prevents or makes impractical use of existing attachment hardware.

SUMMARY OF THE INVENTION

In one aspect of the invention, a tie down anchor includes: an anchor bar having a curved shape and providing a point of attachment; an anchor plate having the anchor bar mounted thereto in a fixed or movable relationship, the anchor bar having the point of attachment on an upper side of the anchor plate; a left side plate extending downwardly from a lower side of the anchor plate at least a first distance, the lower side being opposite the upper side; a right side plate extending downwardly from the lower side of the anchor plate at least the first distance, the left side plate and the right side plate being substantially parallel to one another and being offset from one another; a pin secured to the left side plate and extending outwardly from the left side plate and offset from the lower side by a second distance that is less than the first distance; and an opening defined on the right side plate and offset from the lower side by a third distance that is less than the first distance and different from the second distance by an amount at least greater than an innermost diameter of the opening, the opening being one of threaded and stepped.

In some embodiments, the third distance is greater than the second distance. In some embodiments, a difference between the second distance and the third distance is between 40 and 60 percent of the third distance.

The opening may be defined by an extension secured to the left side plate. The tie down anchor may include a fastener positioned within the opening such that one end of the fastener presses against the left side plate.

The tie down anchor may include a cover plate positioned on the upper side of the anchor plate and a base plate positioned on the lower side of the anchor plate, the anchor bar passing through the cover plate and base plate.

The tie down anchor may include a fastener passing through the cover plate, anchor plate, and base plate and securing the cover plate, anchor plate, and base plate to one another. An entirety of a perimeter of the cover plate may extend outwardly from the anchor plate. The perimeter of the cover plate and the base plate may be trapezoidal. The cover plate may define a recessed portion, the anchor bar passing through the recessed portion.

The anchor bar may include a first leg and a second leg, the first and second legs passing through the cover plate, anchor plate, and base plate. The first and second legs may be slidable relative to the cover plate, anchor plate, and base plate. The first leg may have a first pin secured thereto and extending outwardly therefrom. The second leg may have a second pin secured thereto and extending outwardly therefrom. The first and second pins may be positioned below the base plate.

In some embodiments, the base plate defines one or more retainers, the first and second pins being releasably engageable with the one or more retainers to maintain the anchor bar in an extended position.

The anchor plate, right side plate and left side plate may be a single monolithic piece of metal or composite material.

A method of use may include inserting the left side plate and the right side plate into a stake pocket defined in a top surface of a wall of vehicle. The method may include inserting a fastener through a surface of the wall of the vehicle and into the threaded opening. The fastener may be tightened such that an end of the fastener engages the left side plate and urges the left side plate against an internal surface of the wall of the vehicle and urges then holds in compression s a pin into an internal opening defined by the internal surface.

The method may include positioning the tie down anchor by inserting the tie down anchor with a lower surface of the cover plate resting on the top surface of the wall of the vehicle.

The method may include urging the anchor bar into the recessed portion such that the anchor bar does not extend above the cover plate. The method may include urging the anchor bar into an extended position in which the first and second pins engage the one or more retainers within the vehicle stake pocket. The method may include securing any type of a rope or strap to the anchor bar.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
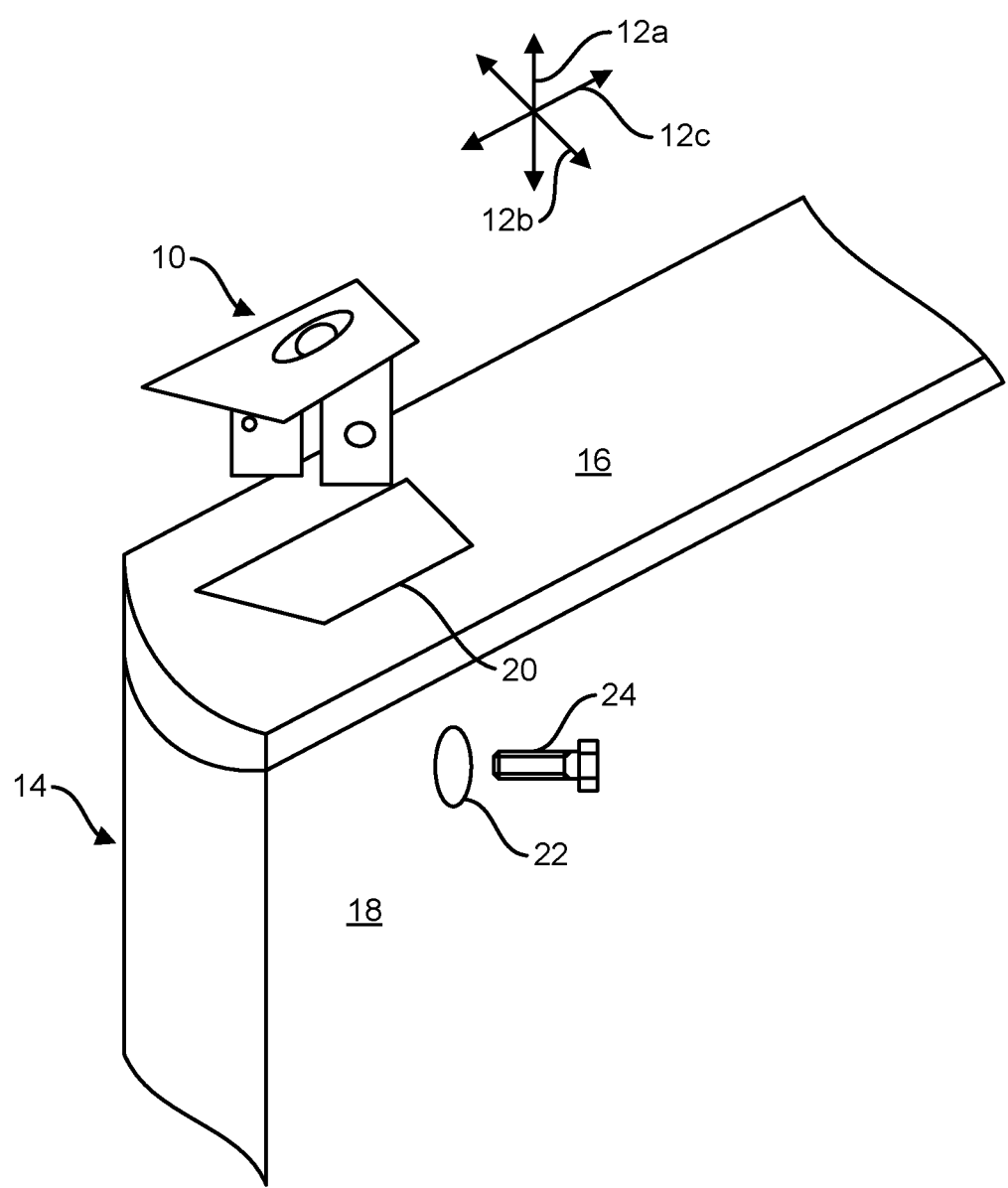
FIG. 1 is an isometric view illustrating installation of a tiedown anchor to a wall of a truck bed in accordance with an embodiment of the present invention.

Referring to FIG. 1, a tie down anchor 10 may be understood with respect to a vertical direction 12*a*, a transverse direction 12b, and a longitudinal direction 12c that are all mutually perpendicular. The tie down anchor 10 may be mounted to a wall 14 of a truck bed. In particular, the wall 14 may include a top surface 16 or rail and an inner wall surface 18. The top surface 16 may be flat or rounded and extends generally in the transverse direction 12b and longitudinal direction 12c. The inner wall surface 18 may extend generally in the vertical direction 12a and the longitudinal direction 12c.

The top surface 16 defines a stake pocket 20. The perimeter of the stake pocket 20 may be substantially (e.g., within 10 degrees of) perpendicular to the vertical direction 12a. The inner wall surface 18 defines an opening 22. The opening 22 is positioned below the stake pocket 20 along the vertical direction 12a and may be aligned with the stake pocket 20 along the longitudinal direction 12c, e.g. be completely overlapped by the stake pocket 20 along the longitudinal direction 12c. The opening 22 may be an opening provided in some pickup models for use in handling the truck bed during manufacture and when placing the truck bed on the frame of a truck. A bolt 24 may be inserted into the opening 22 and engage the tie down anchor 10 as described below.

Figure 3:
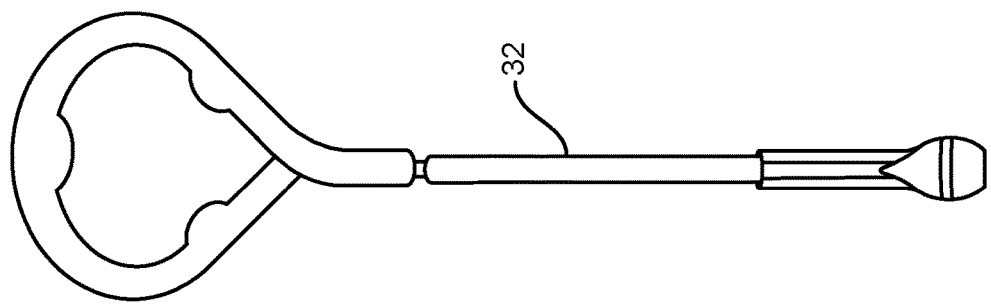
FIG. 3 is a front view of a tool for removing a cover of a stake pocket in accordance with the prior art.
Figure 2:
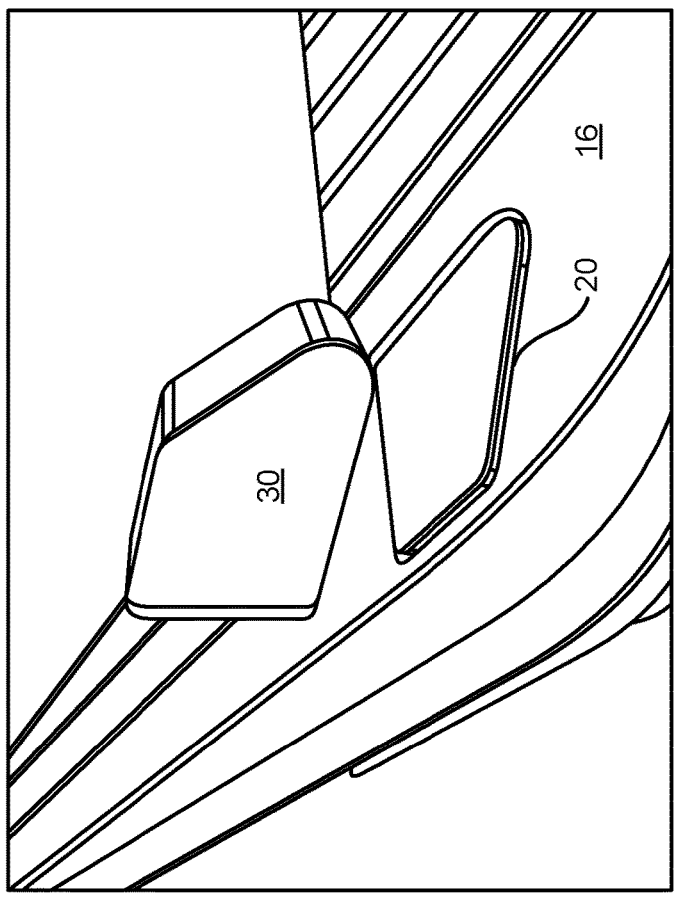
FIG. 2 is a perspective view illustrating removal of a cover for a stake pocket of a truck bed in accordance with the prior art.

Referring to FIG. 2, the stake pocket 20 may have a cover 30 inserted therein, such as a plastic cover 30 that is retained by a snap fit in the stake pocket 20. The cover 30 may be manufactured by a third party and installed by a user to avoid contamination of the stake pocket 20. The cover 30 may be removed using a pry tool, such as the pry tool 32 shown in FIG. 3 that may be embodied as a lid removal tool for paint cans as known in the art. The cover 30 may also be used to remove the tie down anchor 10 following installation.

Figure 4:
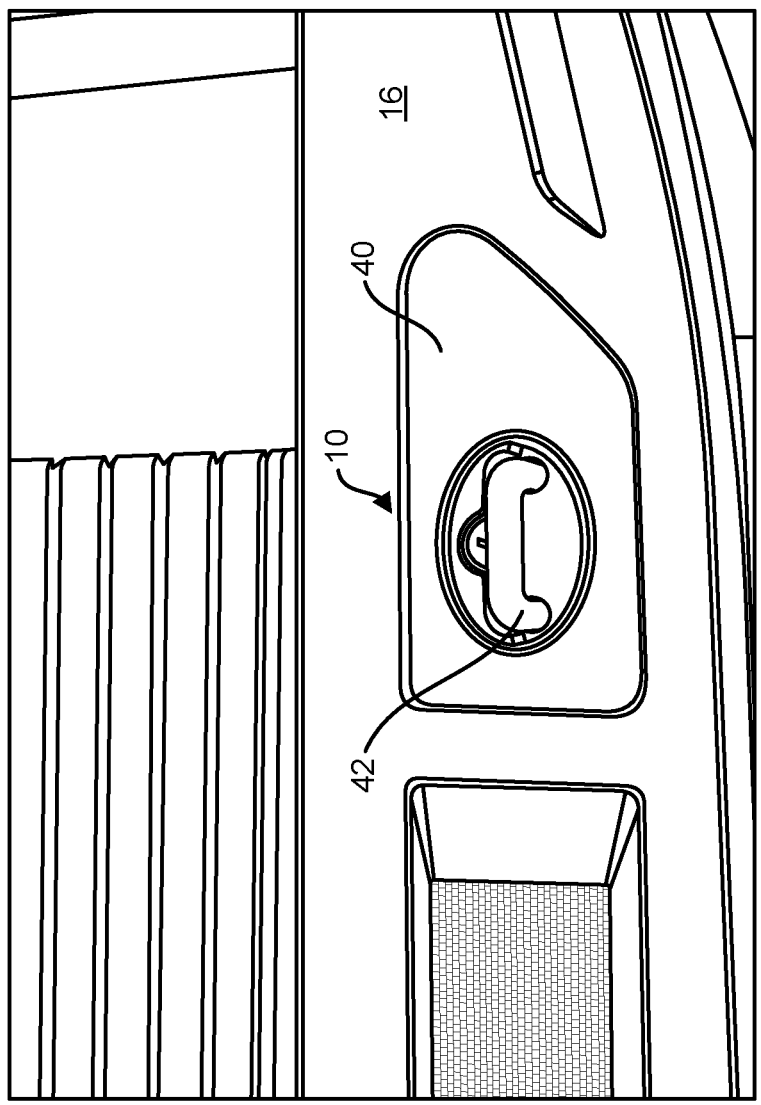
FIG. 4 is a perspective view illustrating the tiedown anchor installed in the stake pocket of a truck bed in accordance with an embodiment of the present invention.

Referring to FIG. 4, the tie down anchor 10 may include a cover plate 40 that is sized to occupy the stake pocket 20. The tie down anchor 10 includes an anchor bar 42, that may be U-shaped, that protrudes from the cover plate 40 and provides an attachment point for ropes, straps, or other securement structures.

Figure 5A:
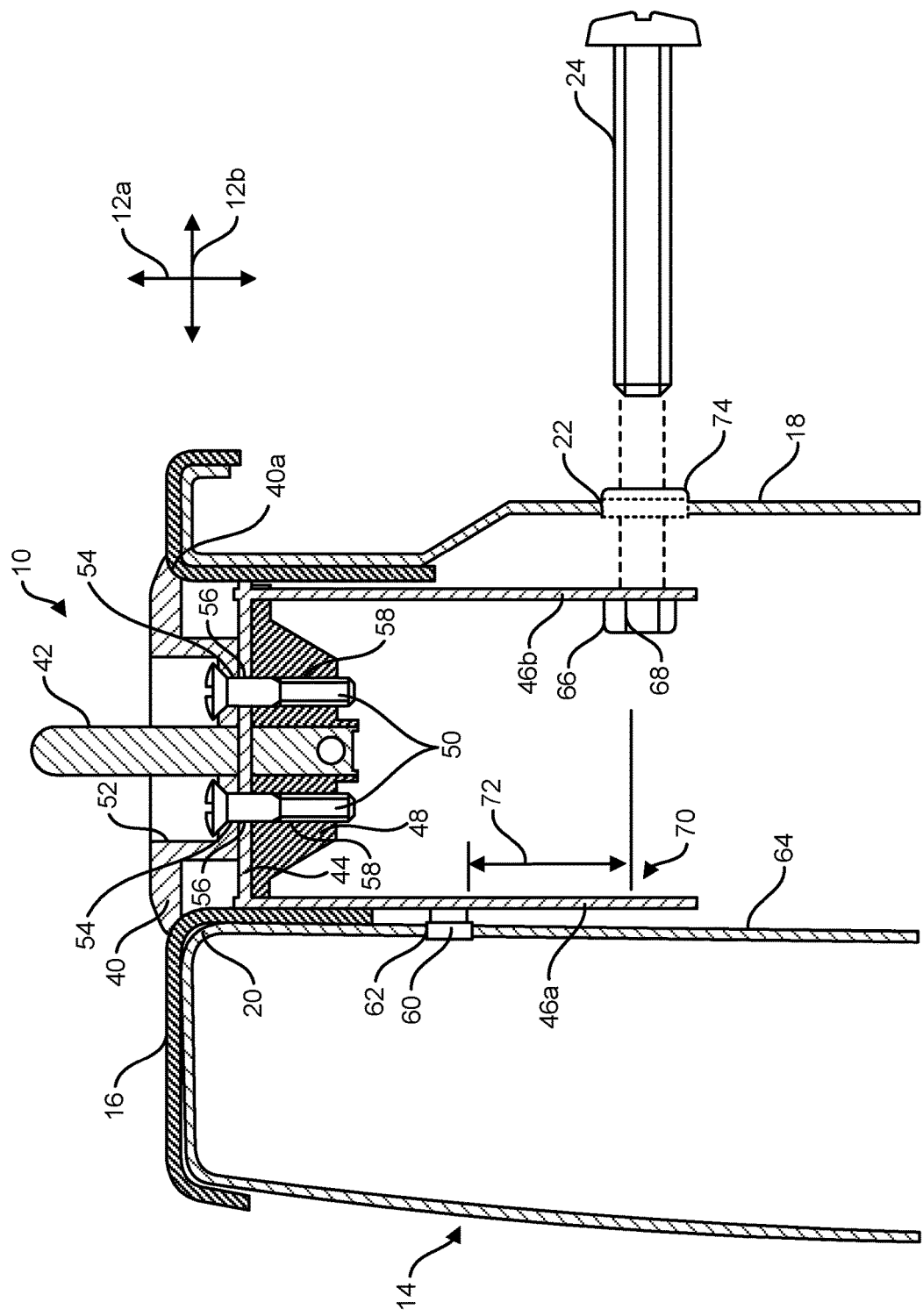
FIG. 5A is a cross sectional view of the tie down anchor positioned in the stake pocket of the truck bed in accordance with an embodiment of the present invention.

FIGS. 5A through 5F illustrate structures of the tie down anchor 10 that provide improved functionality relative to prior tie down anchor. Referring specifically to FIG. 5A, the cover plate 40 may include a perimeter surface 40a that engages the stake pocket 20. The perimeter surface 40a may correspond in shape to the outer surface of the stake pocket cover 30. Accordingly, the perimeter surface 40a may have a trapezoidal shape with rounded corners as shown in FIG. 2. In the illustrated embodiment, the perimeter surface 40a engages a rounded transition between the top surface 16 and walls of the stake pocket 20. The cover plate 40 may define a snap fit interface, such as with the surface 40a, for engaging the stake pocket 20. Accordingly, the pry tool 32 may be used to remove the cover plate 40 after it has been snapped into the stake pocket 20.

The tie down anchor 10 may be fastened to an anchor plate 44. The anchor plate 44 may be a different member than the cover plate 40 and be made of a different material. For example, the cover plate 40 may be made of plastic whereas the anchor plate 44 is made of metal. The anchor plate 44 may also be made of a composite material, such as carbon fiber composite. The anchor plate 44 may be sized to fit through the stake pocket 20. The anchor plate 44 may have side plates 46a, 46b extending downwardly from opposing edges of the anchor plate 44. In use, the anchor plate 44 may have its upper and lower surfaces substantially parallel to the transverse direction 12b and the longitudinal direction 12c. The right and left surfaces of the side plates 46a, 46b may be oriented substantially parallel to the vertical direction 12a and the longitudinal direction 12c. As used herein "substantially" as used with respect to an orientation shall be understood to mean within 5 degrees of the that orientation.

In the illustrated embodiment, the anchor plate and side plates 46a, 46b may be made of a single strip of metal, e.g., steel, that is bent or otherwise formed into the illustrated shape. In other embodiments, side plates 46a, 46b are secured to the anchor plate 44 by some other fastening means such as welds. In still other embodiments, the anchor plate 44 and side plates 46a, 46b are made of a composite material having the illustrated shape, such as a carbon fiber composite material.

The anchor plate 44 may secure to the cover plate 40 by means of a base plate 48 such that the anchor plate 44 is positioned between the cover plate 40 and the base plate 48. One or more fasteners 50, such as one or more screws, may pass through the cover plate 40, through the anchor plate 44, and engage the base plate 48. For example, the one or more fasteners 50 may pass through one or more openings 54 in the cover plate 40, one or more openings 56 in the anchor plate 44, and engage threaded openings 58 in the base plate 48. The cover plate 40 ma define a recess 52 of sufficient depth that the fastener 50 does not protrude above an upper surface of the cover plate 40. In some embodiments, the depth of the recess 52 is equal to or greater than the diameter of the anchor bar 42, such that the anchor bar 42 does not protrude above the upper surface of the cover plate 40 when retracted.

The side plate 46a may include a pin 60 protruding outwardly from an outward facing surface thereof (left in the illustrated configuration). The pin 60 may engage an opening 62 formed in an internal surface 64 of the wall 14. In particular, the internal surface 64 may be covered by the inner wall surface 18.

The side plate 46b may include a threaded opening 68 for receiving the bolt 24. In some embodiments, to provide greater thread engagement, the threaded opening 68 may be defined by a threaded extension 66 secured to the side plate 46b, such as secured to an inward facing surface of the side plate 46b. The threaded extension 66 may be secured to side plate 46b by means of welds.

In the following description, reference is made to the bolt 24 engaging the threaded opening 68. It shall be understood that other types of adjustable fastener may be used, such as a stepped fastener in place of the bolt 24 engaging a stepped opening in place of the opening 68.

As is apparent in FIG. 5A, the top of the opening 68 and the bottom of the opening 62 are offset from one another by an amount 72. In the illustrated embodiment, the pin 60 and opening 62 are positioned between the anchor plate 44 and the opening 68 along the vertical direction 12a. For example, a bottom of the pin 60 may be positioned offset above a top of the opening 68 along the vertical direction 12a by an amount 72 at least as great as the inner most diameter of the opening 68. In some embodiments the bottom of the pin 60 may be positioned offset above the top of the opening 68 by an amount equal to between 40 and 60 percent of the distance from the bottom of the anchor plate 44 to the top of the opening 68.

Figure 5B:
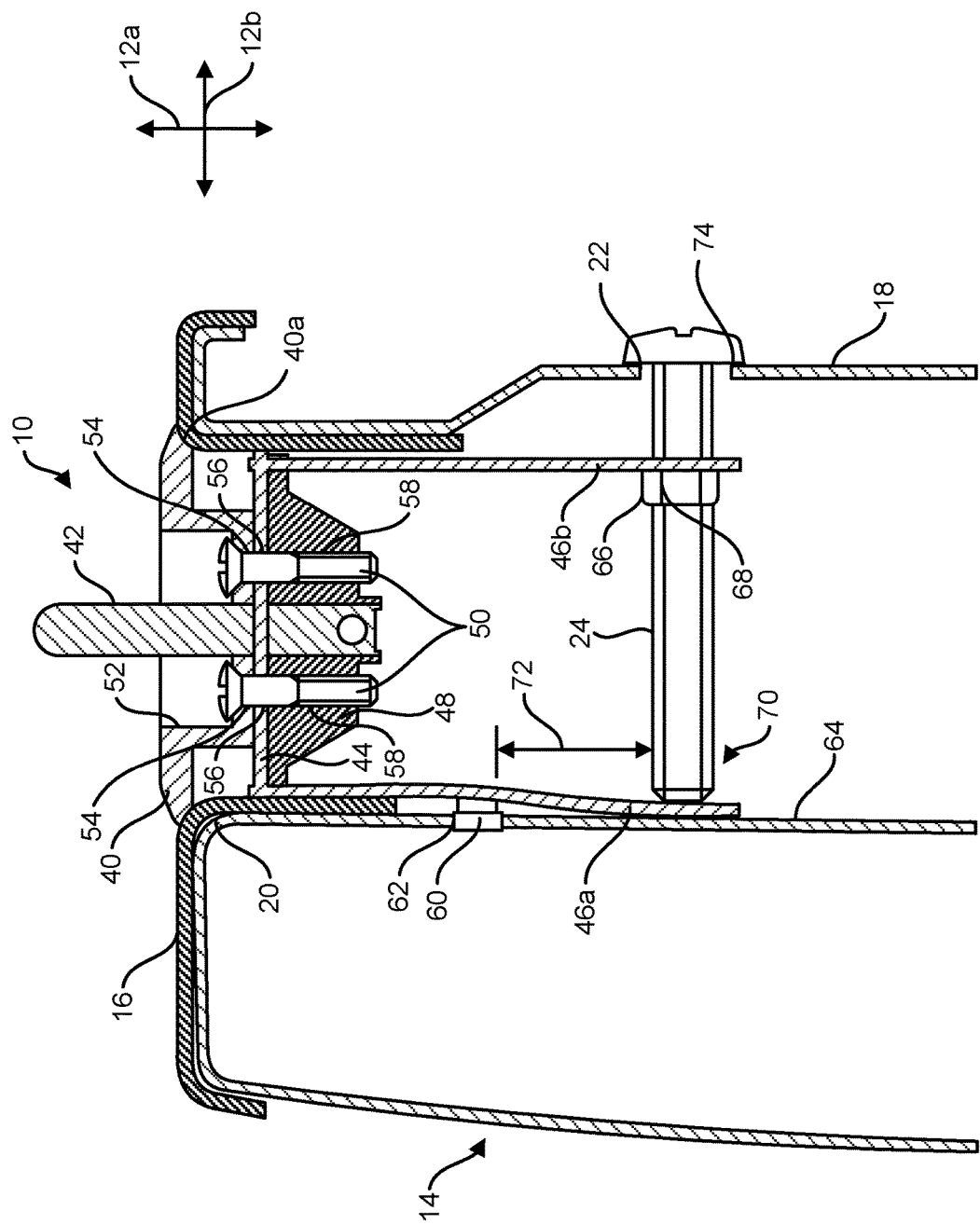
FIG. 5B is a cross sectional view of the tie down anchor secured within the stake pocket of the truck bed in accordance with an embodiment of the present invention.

As shown in FIG. 5B, the bolt 24 may be inserted through the opening 22 and through the threaded opening 68. The bolt 24 may be tightened until the bolt 24 engages a portion 70 of the opposite side plate 46a, thereby pushing the side plate 46a against the internal surface 64 and urging the pin 60 into the opening 62. Where a stepped fastener and stepped opening are used in place of the bolt 24 and the threaded opening 68, the stepped fastener may be urged into the stepped opening in order to push against the side plate 46*a* in a like manner.

Removal of the tie down anchor 10 is therefore resisted by both the pin 60 and the bolt 24 engaging the opening 22. In some embodiments, the opening 22 may be of sufficiently large diameter, that the bolt 24 does not engage sides of the opening. Accordingly, the pin 60 may provide primary load bearing capacity to resist removal. In some applications, the opening 22 may be occupied by a plug 74 that may be removed prior to inserting the bolt 24.

Figure 5C:
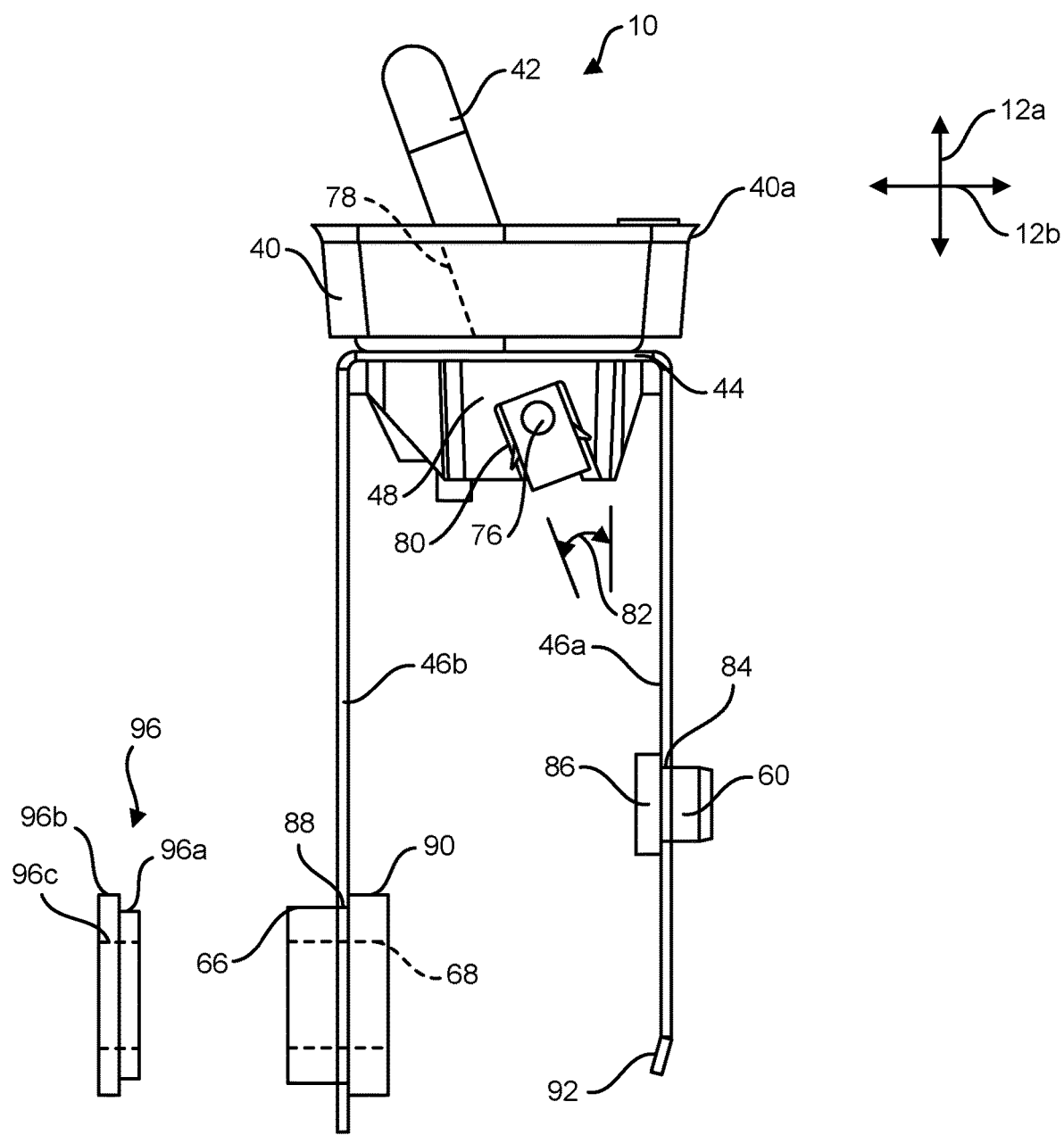
FIG. 5C is a side view of the tie down anchor in accordance with an embodiment of the present invention.
Figure 5D:
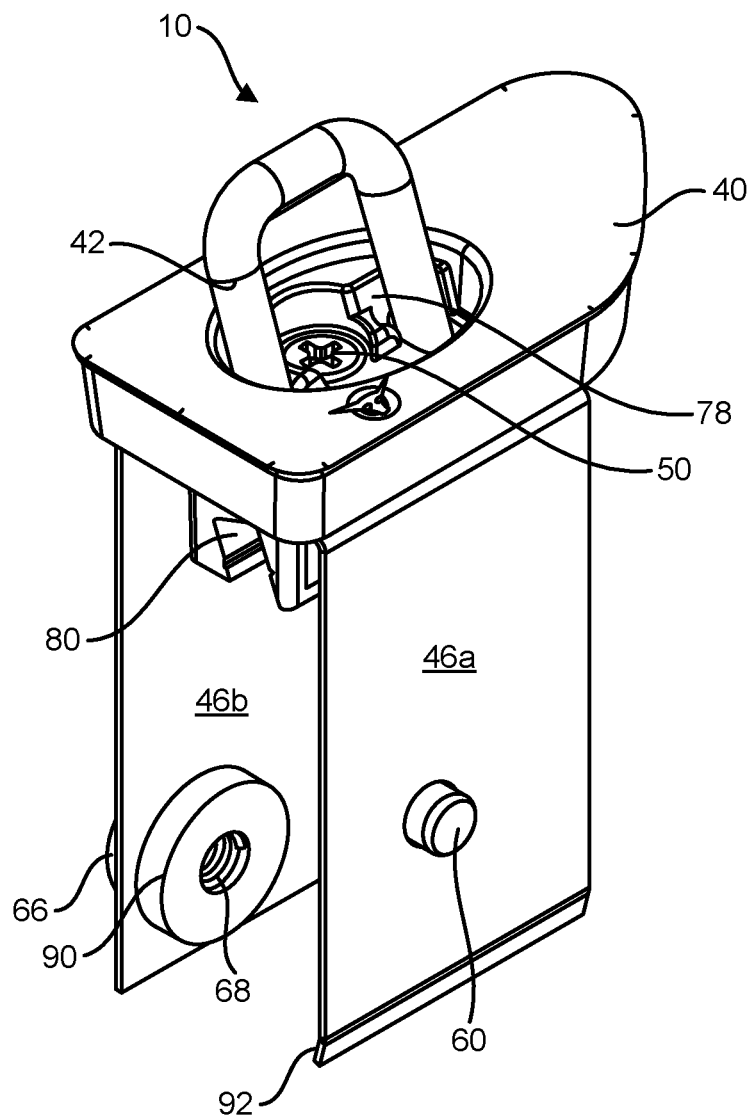
FIG. 5D is an isometric view of the tie down anchor in accordance with an embodiment of the present invention.

Referring specifically to FIGS. 5C and 5D, while still referring to FIGS. 5A and 5B, the anchor bar 42 may be U-shaped including legs that pass through openings in the cover plate 40, anchor plate 44, and base plate 48 such that ends of the legs protrude below the base plate 48 as shown in FIGS. 5A, 5B, and 5C. The protruding legs of the anchor bar 42 may each include a pin 76 extending partially or completely through the leg and protruding outwardly from the leg. Accordingly, the pins 76 may resist removal of the anchor bar 42 during use. In some embodiments, a single pin 76 extending through both legs of the anchor bar 42 is used. The one or more pins 76 may have an interference fit relative to openings in the anchor bar 42 in order to retain the one or more pins in engagement with the legs of the anchor bar 42.

In some embodiments, the anchor bar 42 is urged into an angled orientation relative to the vertical direction when in an extend position such that the anchor bar 42 protrudes above the cover plate 40. One or more angled surfaces 78 within the recess 52 in the cover plate 40 and one or more angled surfaces 80 defined by the base plate 48 may engage the legs of the anchor bar 42 and urge the anchor bar 42 into the angled orientation such that a center line of each leg of the anchor bar 42 defines an angle 82 relative to the vertical direction 12*a*. For example, the angle 82 may be between 15 and 45 degrees.

The illustrated implementation of the anchor bar 42 is exemplary only. The anchor bar 42 may have various shapes, may be fixed rather than slidable, and may be oriented perpendicular to the cover plate 40 rather than at a non-perpendicular angle 82.

FIGS. 5C and 5D further illustrate alternative implementations of the pin 60 and extension 66. For example, side plate 46*a* may define an opening 84 that receives the pin 60. A widened portion 86 secured to the pin 60 may be larger than the opening 84 and be located against an inner surface of the side plate 46*a* thereby providing a large diameter structure that may be welded or otherwise secured to the side plate 46*a*. The pin 60 and widened portion 86 may be secured to one another by being a monolithic piece of material such as steel.

In a like manner, the extension 66 may insert through an opening 88 defined in the side plate 46*b* and a widened portion 90 may secure to the extension 66 with the opening 68 passing through both the extension 66 and the widened portion 90. The widened portion 90 may be positioned against an inner surface or an outer surface of the side plate 46*b* and secured by means of welds or other fastening means. The extension 66 and widened portion 90 may be secured to one another by being a monolithic piece of material such as steel.

FIG. 5C further illustrates an alternative implementation of a side plate 46*a*, 46*b*. In the illustrated embodiment, an end portion 92 of endplate 46*a* is bent inwardly. This may provide a tapered width of the combined side plates 46*a*, 46*b* to facilitate insertion of the tie down anchor 10 into the stake pocket 20.

In some embodiments, the bolt 24 may be used in combination with the illustrated washer 96. The washer 96 is shown as a side view and may be circular in a plane perpendicular to the page. The washer may include a smaller outer diameter (OD) portion 96*a* and a larger OD portion 96*b* both of which may be cylindrical in shape. In some embodiments, the smaller OD portion 96*a* has a diameter sized to insert within the opening 22 and the larger OD portion 96*b* has a diameter larger than the opening 22 such that it rests against the inner wall surface 18 with the smaller OD portion positioned within the opening 22. The washer 96 defines an opening 96*c* sized to receive the threaded shaft of the bolt 24. The opening 96*c* may be unthreaded and sized to allow insertion of the shaft of the bolt 24 without interference.

Figure 5E:
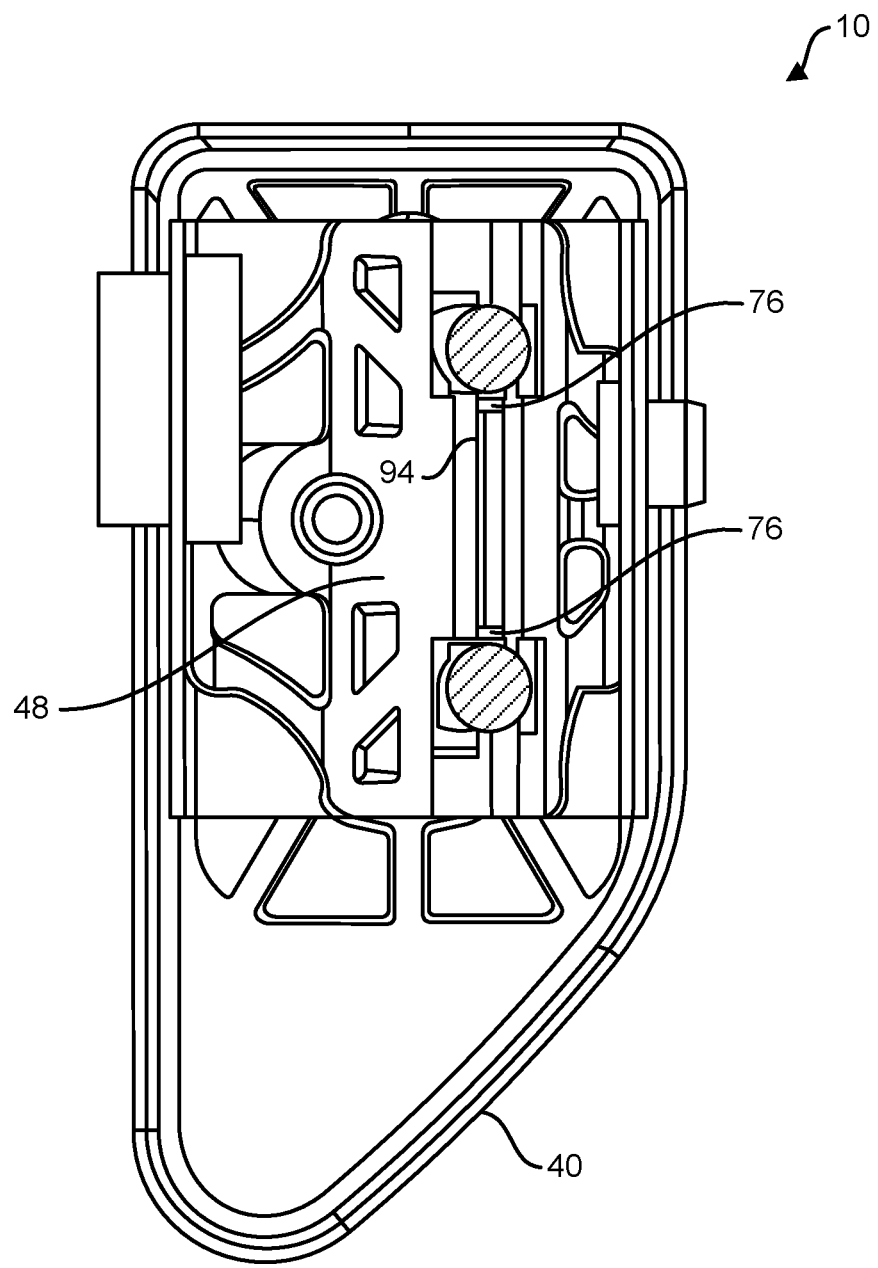
FIG. 5E is a bottom view of the tie down anchor in accordance with an embodiment of the present invention.

Referring to FIG. 5E, in some embodiments, a lower surface of the base plate 48 may define one or more grooves 94 that are positioned to engage the pins 76 when the anchor bar 42 is in the extended position. The one or more grooves 94 may receive the pins 76 in an interference fit such that deformation of material around the one or more grooves 94 is required to insert the pins 76. Accordingly, the one or more grooves 94 may retain the anchor bar 42 in the extended position.

Figure 5F:
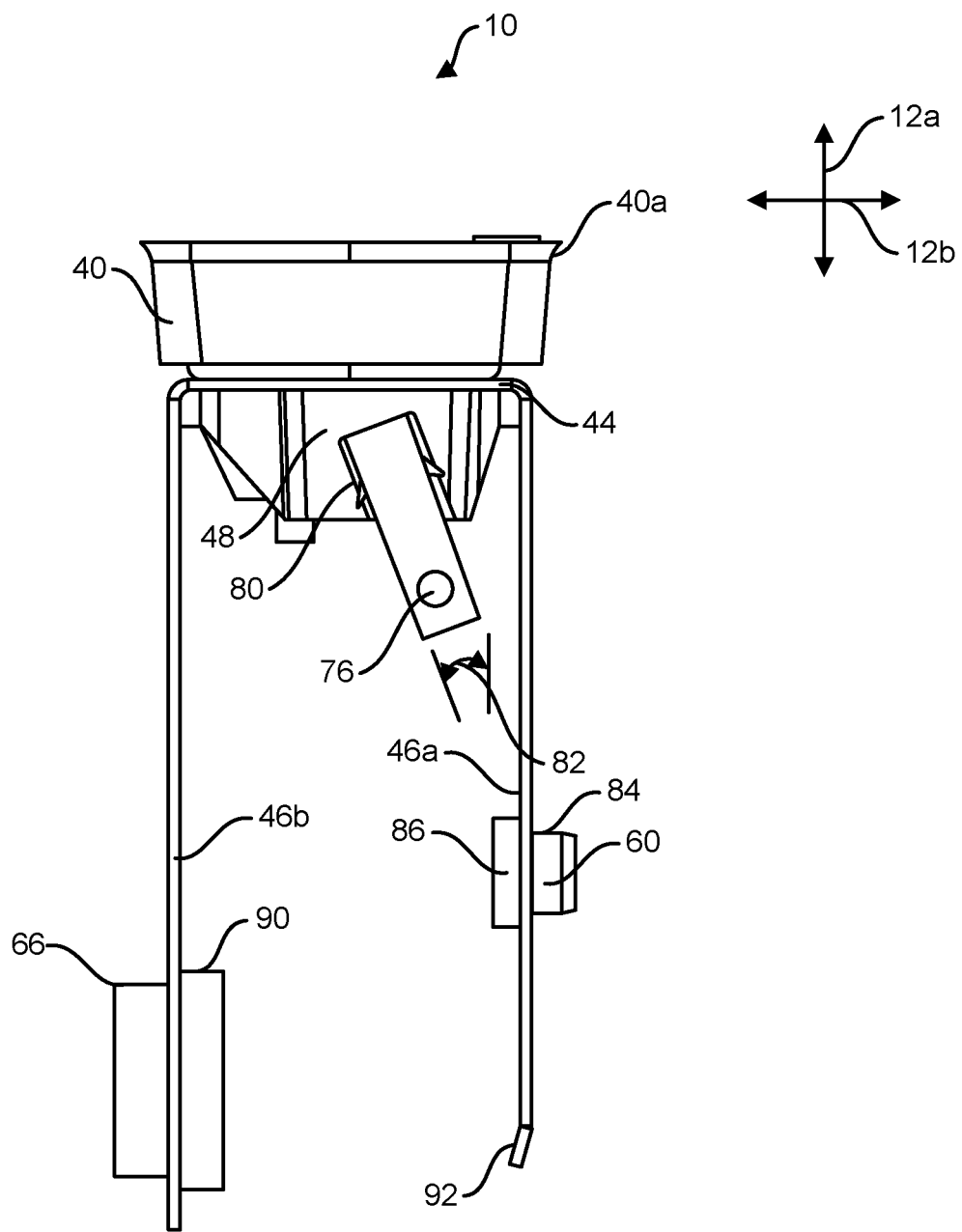
FIG. 5F is a bottom view of the tie down anchor in accordance with an embodiment of the present invention.

FIG. 5F illustrates the anchor bar 42 in the retracted position. As is apparent the anchor bar 42 may be positioned below a top of the cover plate 40 with the pins 76 disengaged from the one or more grooves 94. The anchor bar may be moved to the retracted position by exerting a downward force sufficient to for the pins 76 out of the one or more grooves 94.

Figure 6A:
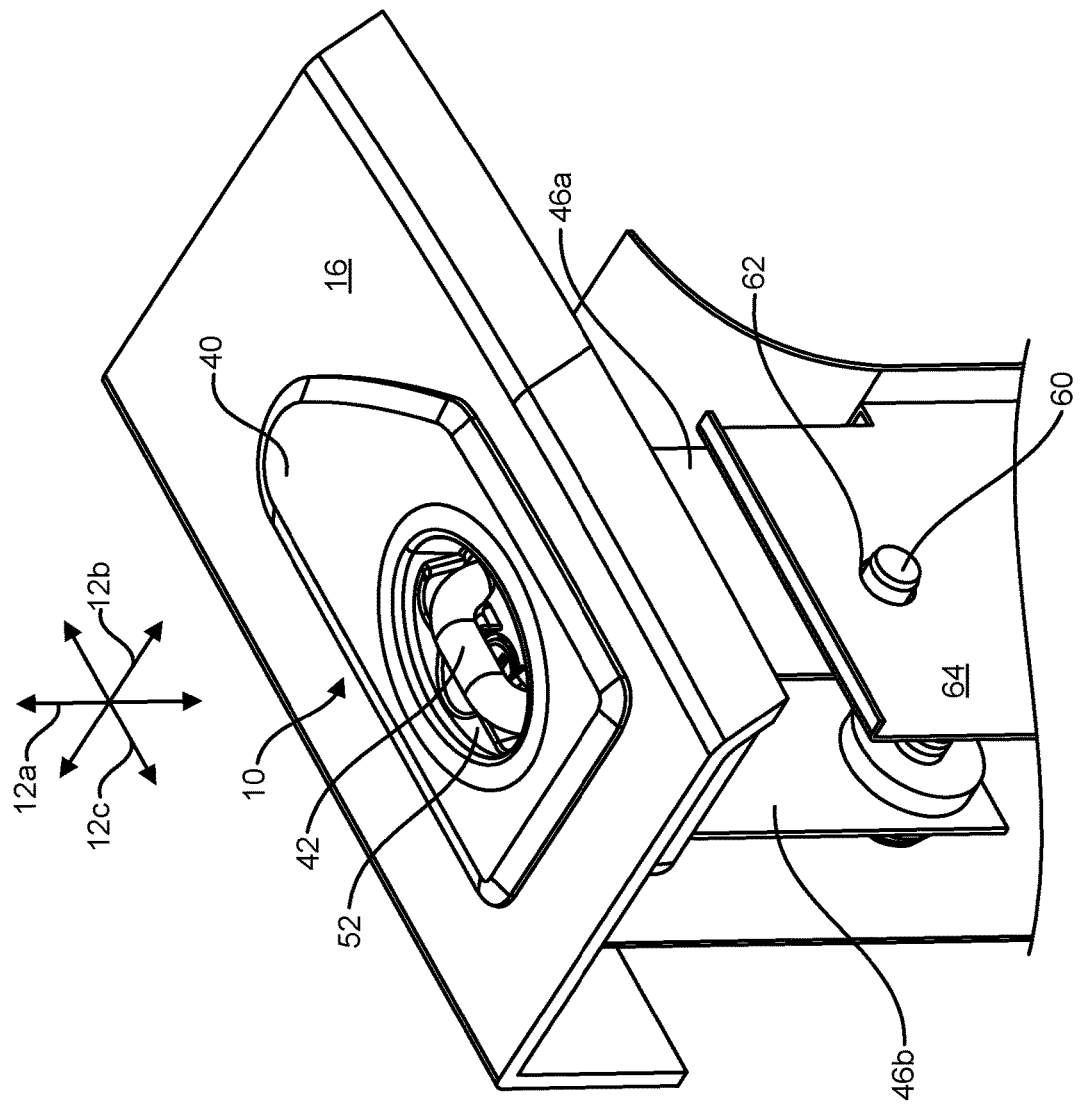
FIG. 6A is a cross-sectional view of an alternative embodiment of a tie down anchor in accordance with an embodiment of the present invention.

FIG. 6A illustrate various alternative embodiments for various features of the tie down anchor 10. An insert plate 100 may be positioned within a recess 102 of the cover plate 40, the insert plate 100 defining the opening 54 for receiving the fastener 50. The insert plate 100 may further define the recess 52 as described above. The insert 100 may define a shoulder surface 104 that engages a corresponding shoulder surface 106 on the cover plate 40 that extends around the recess 52. The shoulder surfaces 104, 106 may be substantially parallel to the transverse and longitudinal directions 12*b*, 12*c*. A lower surface 108 of the cover plate may be planar and substantially parallel to the transverse and longitudinal directions 12*b*, 12*c* such that the lower surface 108 rests on the top surface 16 rather on the curved transition between the top surface 16 and the vertical surfaces of the stake pocket 20. However, as is apparent, a portion of the cover plate 40 does extend below the top surface 16 and may facilitate alignment of the tie down anchor 10 within the stake pocket 20. In the illustrated embodiment, there is substantial clearance available (e.g., 1 mm all around) between the cover plate 40 and the vertical sides of the stake pocket 20 such that a press fit is not required for insertion.

Figure 6B:
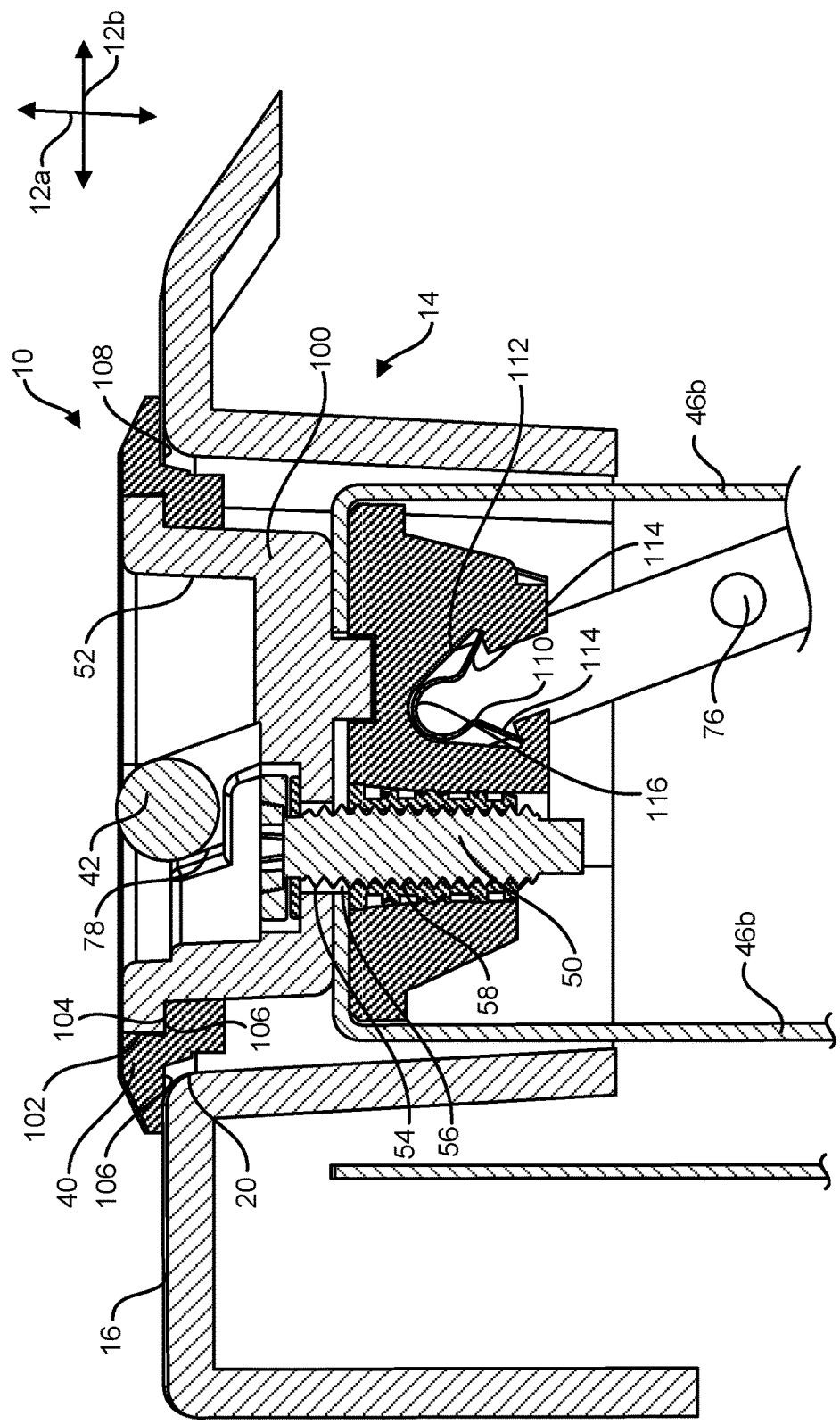
FIG. 6B is an isometric view of the embodiment of FIG. 6A.

FIG. 6B further illustrates an alternative to the one or more grooves 94. For example, one or more clips 110 may be used seated within a recess 112 in the base plate 48 such that the pins 76 may be forced into the clips 110 and retained. As is apparent in FIG. 6B, the clips 110 may include a strip of metal or plastic formed in the illustrated shape, including flared end portions 114 for guiding the pin 76 into the clip 110 and a circular portion 116 circumscribing between 200 and 270 degrees such that the circular portion will retain the pin 76 when forced into the circular portion 116 by an upward force on the anchor bar 42.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A tie down anchor comprising:
   an anchor bar having a curved shape and providing a point of attachment;
   an anchor plate having the anchor bar mounted thereto in a fixed or movable relationship, the anchor bar having the point of attachment on an upper side of the anchor plate;
   a left side plate extending downwardly from a lower side of the anchor plate at least a first distance, the lower side being opposite the upper side;
   a right side plate extending downwardly from the lower side of the anchor plate at least the first distance, the left side plate and the right side plate being substantially parallel to one another and being offset from one another;
   a pin secured to the left side plate and extending outwardly from the left side plate and offset from the lower side by a second distance that is less than the first distance; and
   an opening defined on the right side plate and offset from the lower side by a third distance that is less than the first distance and different from the second distance by an amount at least greater than an innermost diameter of the opening, the opening being one of threaded and stepped.

2. The tie down anchor of claim 1, wherein the third distance is greater than the second distance.

3. The tie down anchor of claim 2, wherein a difference between the second distance and the third distance is between 40 and 60 percent of the third distance.

4. The tie down anchor of claim 1, wherein the opening is defined by an extension secured to the left side plate.

5. The tie down anchor of claim 1, further comprising a fastener positioned within the opening such that one end of the fastener presses against the left side plate, the fastener being one of threaded and stepped.

6. The tie down anchor of claim 1, further comprising a cover plate positioned on the upper side of the anchor plate and a base plate positioned on the lower side of the anchor plate, the anchor bar passing through the cover plate and base plate.

7. The tie down anchor of claim 6, further comprising a movable or fixed fastener passing through the cover plate, anchor plate, and base plate and securing the cover plate, anchor plate, and base plate to one another.

8. The tie down anchor of claim 7, wherein an entirety of a perimeter of the cover plate extends outwardly from the anchor plate.

9. The tie down anchor of claim 8, wherein the perimeter of the cover plate and a perimeter of the base plate are trapezoidal.

10. The tie down anchor of claim 6, wherein the cover plate defines a recessed portion, the anchor bar passing through the recessed portion.

11. The tie down anchor of claim 6, wherein:
    the anchor bar includes a first leg and a second leg, the first and second legs passing through the cover plate, anchor plate, and base plate, the first and second legs being slidable relative to the cover plate, anchor plate, and base plate; and
    the first leg has a first pin secured thereto and extending outwardly therefrom;
    the second leg has a second pin secured thereto and extending outwardly therefrom; and
    the first and second pins are positioned below the base plate.

12. The tie down anchor of claim 11, wherein the base plate defines one or more retainers, the first and second pins being releasably engageable with the one or more retainers to maintain the anchor bar in an extended position.

13. The tie down anchor of claim 1, wherein the anchor plate, right side plate and left side plate are a single monolithic piece of material, the material being metal or composite.

14. A method comprising:
    providing a tie down anchor including:
       an anchor bar having a curved shape and providing a point of attachment;
       an anchor plate having the anchor bar secured thereto having the point of attachment on an upper side of the anchor plate;
       a left side plate extending downwardly from a lower side of the anchor plate at least a first distance, the lower side being opposite the upper side;
       a right side plate extending downwardly from the lower side of the anchor plate at least the first distance, the left side plate and the right side plate being substantially parallel to one another and being offset from one another;
       a pin secured to the left side plate and extending outwardly from the left side plate and offset from the lower side by a second distance that is less than the first distance; and
       an opening defined on the right side plate and offset from the lower side by a third distance that is less than the first distance and different from the second distance by an amount at least greater than an innermost diameter of the opening, the opening being one of threaded and stepped;
    inserting the left side plate and the right side plate into a stake pocket defined in a top surface of a wall of vehicle;
    inserting a fastener through a surface of the wall of the vehicle and into the opening;
    engaging the fastener with the opening such that an end of the fastener engages the left side plate and urges the left side plate against an internal surface of the wall of the vehicle and urges the pin into an internal opening defined by the internal surface, thereby securely holding the left and right side plates within the stake pocket of the vehicle.

15. The method of claim 14, wherein
    the tie down anchor further comprises a cover plate positioned on the upper side of the anchor plate and a base plate positioned on the lower side of the anchor plate, the anchor bar passing through the cover plate and base plate.

16. The method of claim 15, wherein positioning the tie down anchor comprises inserting the tie down anchor with a lower surface of the cover plate resting on the top surface of the wall of the vehicle.

17. The method of claim 15, wherein
    the cover plate defines a recessed portion, the anchor bar passing through the recessed portion; and the method further comprises urging the anchor bar into the recessed portion such that the anchor bar does not extend above the cover plate.

18. The method of claim 17, wherein:

the anchor bar includes a first leg and a second leg, the first and second legs passing through the cover plate, anchor plate, and base plate, the first and second legs being slidable relative to the cover plate, anchor plate, and base plate; and the first leg has a first pin secured thereto and extending outwardly therefrom;

the second leg has a second pin secured thereto and extending outwardly therefrom; and the first and second pins are positioned below the base plate.

19. The method of claim 17, wherein:

the base plate defines one or more retainers; and the method further comprises urging the anchor bar into an extended position in which the first and second pins engage the one or more retainers.

20. The method of claim 14, further comprising securing any of a rope and a strap to the anchor bar while the left side plate and right side plate are secured within the stake pocket.

\* \* \* \* \*